Figure 3:
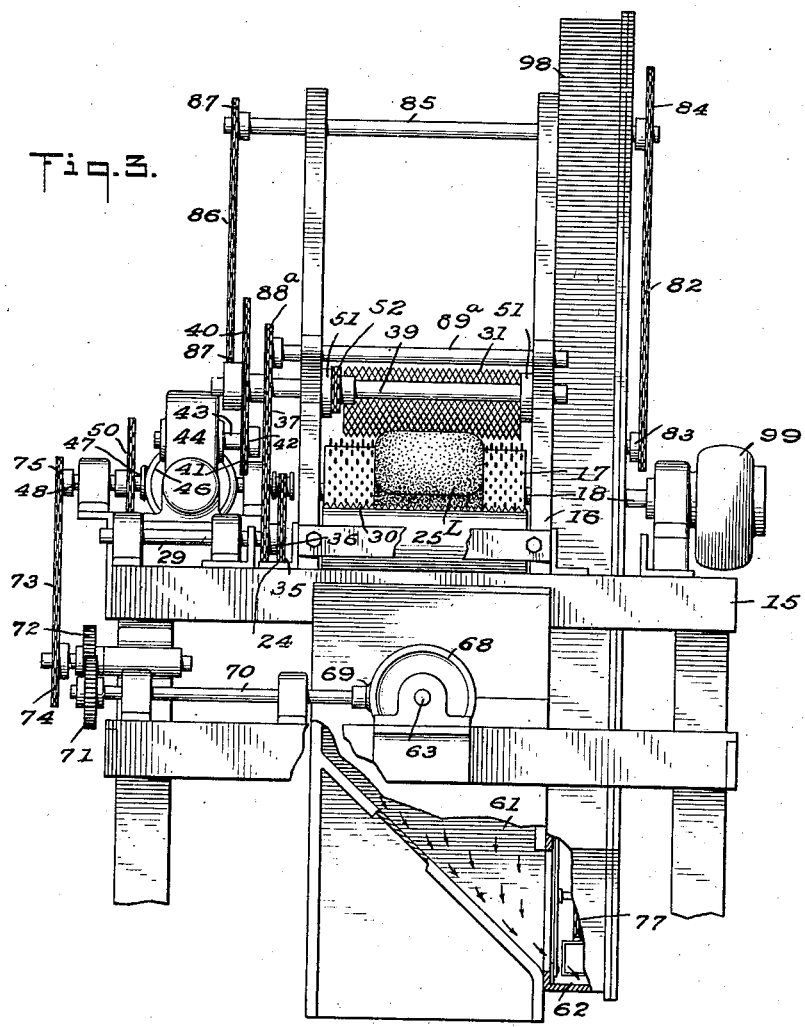

April 1, 1941.  C. S. BRYKCZYNSKI ET AL  2,236,843
GRINDING MACHINE
Filed June 23, 1936  6 Sheets-Sheet 1
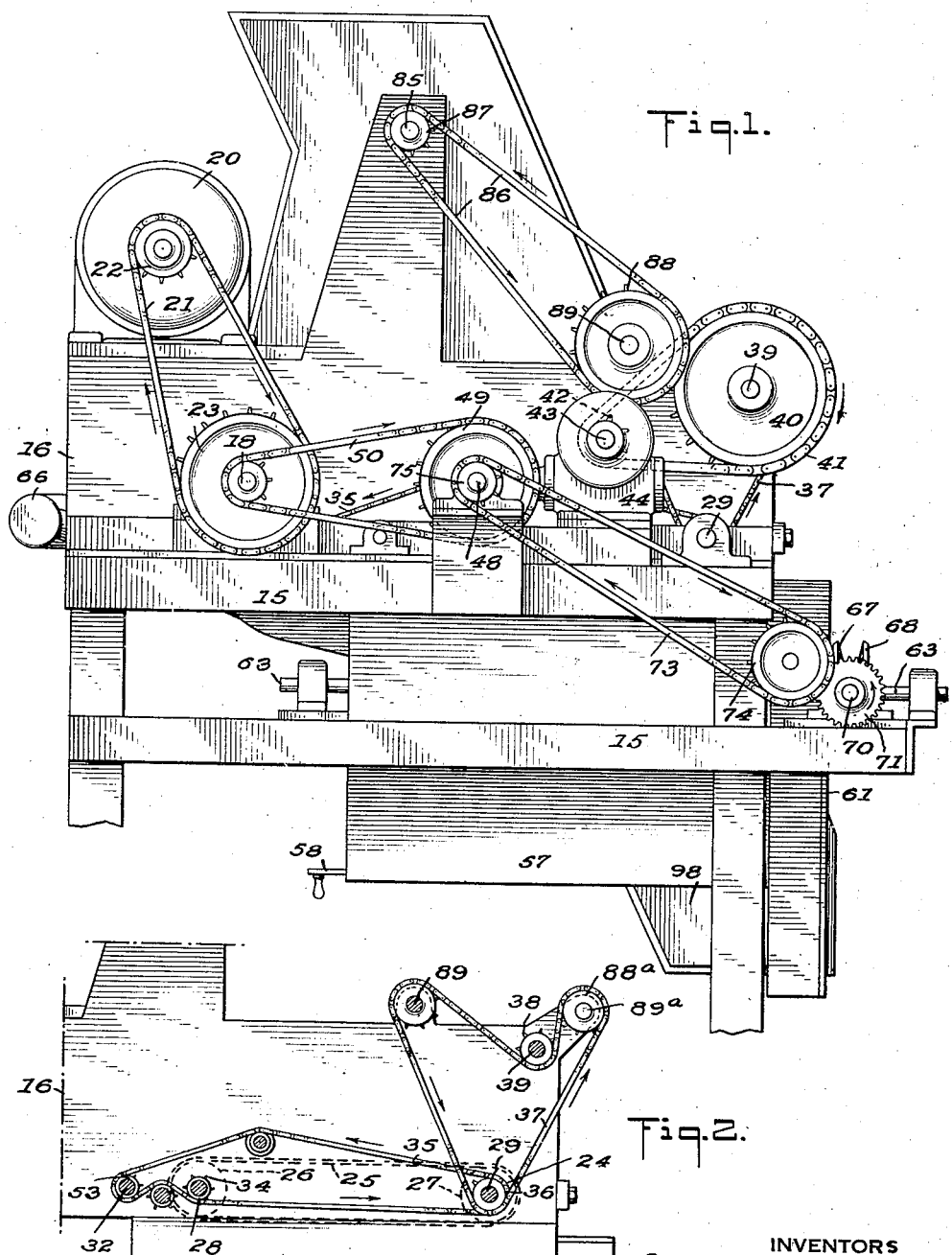
INVENTORS
CHARLES S. BRYKCZYNSKI
and JOHN KOSMAN.
BY
ATTORNEY April 1, 1941. C. S. BRYKCZYNSKI ET AL 2,236,843
GRINDING MACHINE
Filed June 23, 1936 6 Sheets-Sheet 2

INVENTORS
CHARLES S. BRYKCZYNSKI
and JOHN KOSMAN.
BY
ATTORNEY

April 1, 1941.　　C. S. BRYKCZYNSKI ET AL　　2,236,843
GRINDING MACHINE
Filed June 23, 1936　　6 Sheets-Sheet 3

INVENTORS
CHARLES S. BRYKCZYNSKI
and JOHN KOSMAN.
BY
ATTORNEY

April 1, 1941.    C. S. BRYKCZYNSKI ET AL    2,236,843
GRINDING MACHINE
Filed June 23, 1936    6 Sheets-Sheet 4

INVENTORS
CHARLES S. BRYKCZYNSKI
and JOHN KOSMAN
BY
ATTORNEY

April 1, 1941.   C. S. BRYKCZYNSKI ET AL   2,236,843
GRINDING MACHINE
Filed June 23, 1936   6 Sheets-Sheet 5
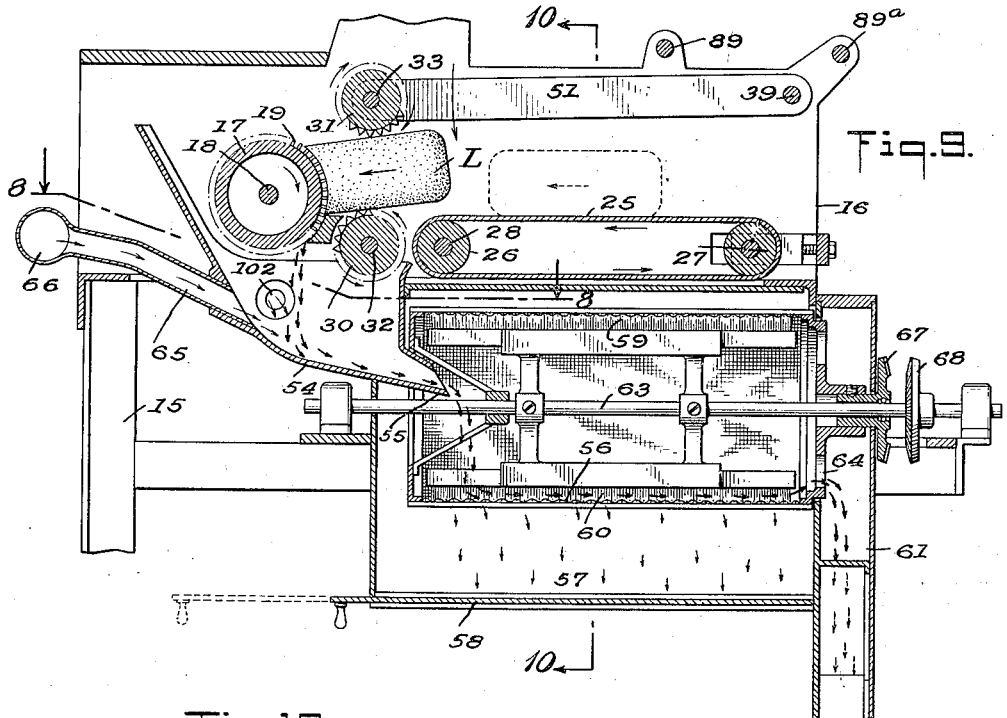
Fig. 9.
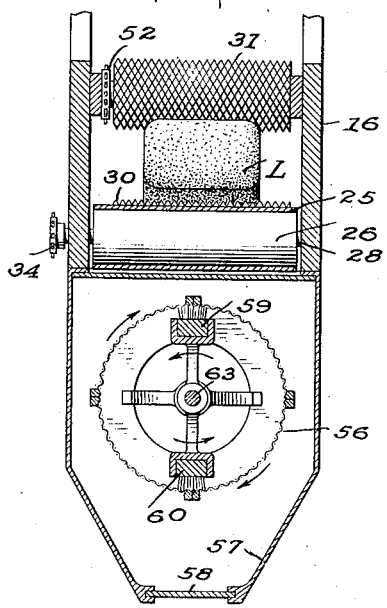
Fig. 10.
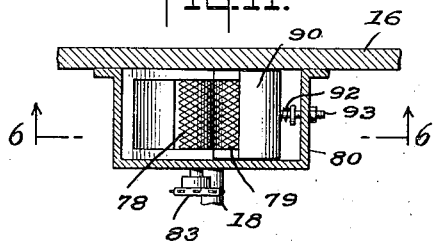
Fig. 11.
Fig. 12.
INVENTORS
CHARLES S. BRYKCZYNSKI
and   JOHN KOSMAN.
BY
ATTORNEY April 1, 1941.　　C. S. BRYKCZYNSKI ET AL　　2,236,843
GRINDING MACHINE
Filed June 23, 1936　　6 Sheets-Sheet 6
Fig. 13.
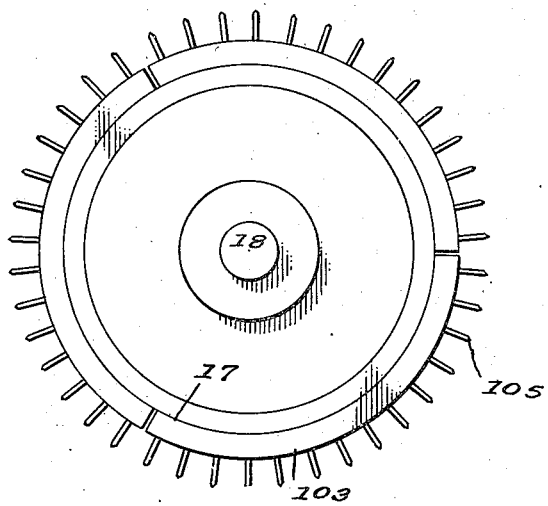
Fig. 15.
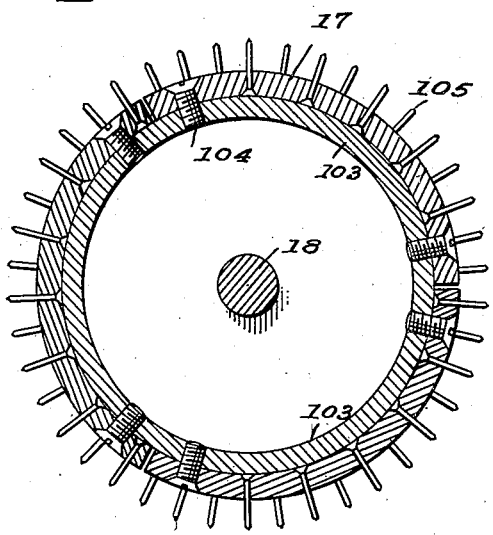
Fig. 14.
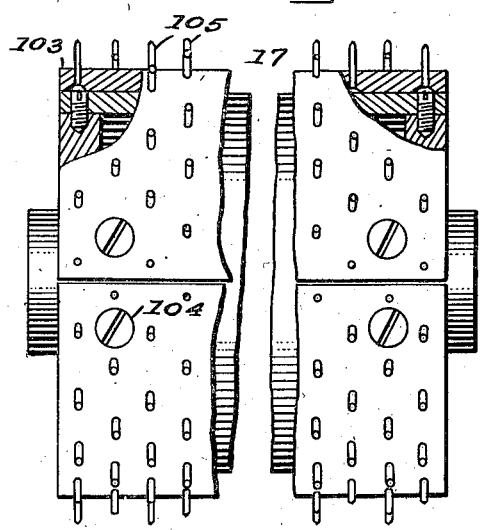
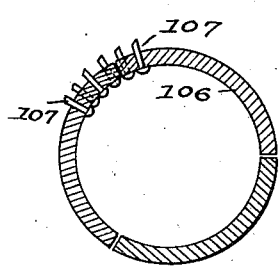
Fig. 16.
Inventors
CHARLES S. BRYKCZYNSKI
and JOHN KOSMAN.
By
Attorney Patented Apr. 1, 1941

2,236,843

UNITED STATES PATENT OFFICE 2,236,843

GRINDING MACHINE

Charles S. Brykczynski and John Kosman, Brooklyn, N. Y., assignors to Geo. F. Stuhmer & Company, New York, N. Y., a corporation of New York Application June 23, 1936, Serial No. 86,850

7 Claims. (Cl. 83—94)

The present invention relates to a method of and apparatus for grinding solid bodies and consists in the novel steps of procedure, and combinations and arrangements of elements of apparatus hereinafter described and particularly set forth in the claims.

The primary purpose of the invention is to devise a method of and apparatus for reducing to granular form solid bodies such as food products e. g., vegetables, either raw or cooked; cheese, bread, or the like, wherein the same is subjected to successive and co-related treatments which will efficiently and gradually break down the solid structure into a substantially uniform granular mass of any desired fineness. And while the following description of the apparatus and its manner of operation mentions bread it is to be understood that such is in an illustrative sense only and not a restrictive one for, as stated, the machine is designed to grind solid bodies generally.

The apparatus or machine is characterized in that it embodies a secondary grinder which receives the oversized particles from a separator, after the first grinding operation, thereby insuring complete reduction or disintegration of the article under treatment and obtaining therefrom a uniformly granular product, the several parts or elements of the machine being assembled into a compact and unitary structure and with all parts thereof conveniently accessible.

The invention is shown by way of illustration in the accompanying drawings wherein:

Figure 1 is a side elevational view of the machine complete.

Figure 2:
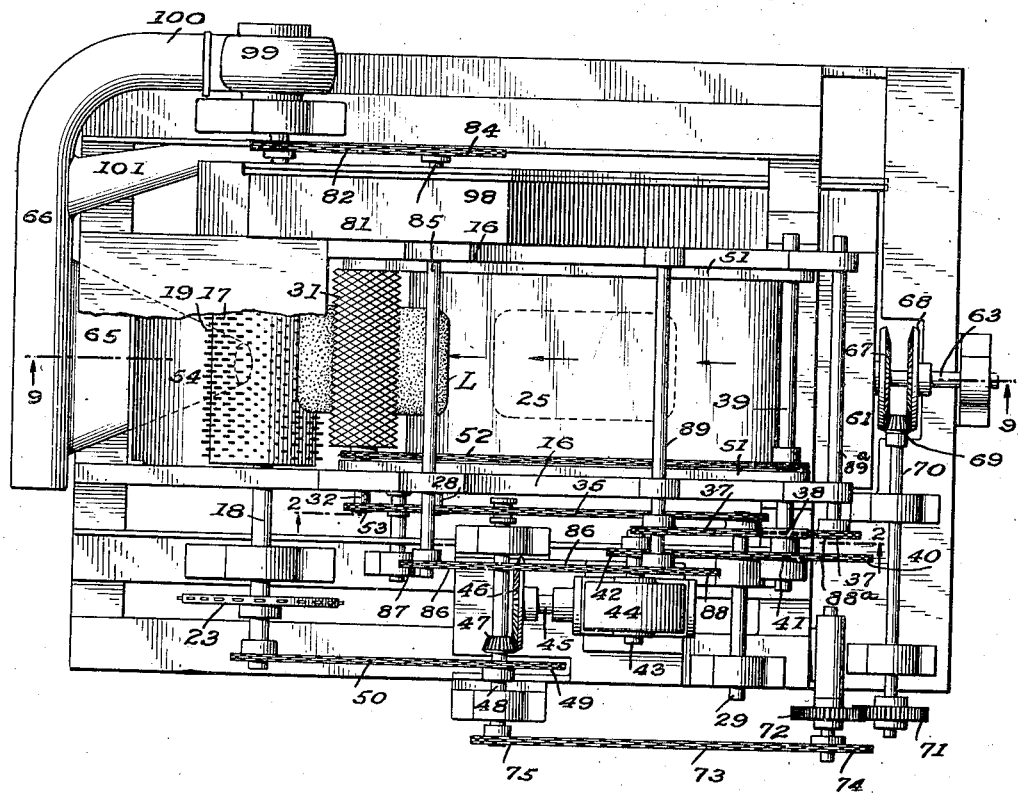

Figure 2 a longitudinal sectional view taken on the line 2—2 of Figure 7.

Figure 3 a front elevational view partly broken away to show the course or flow of ground material.

Figure 4:
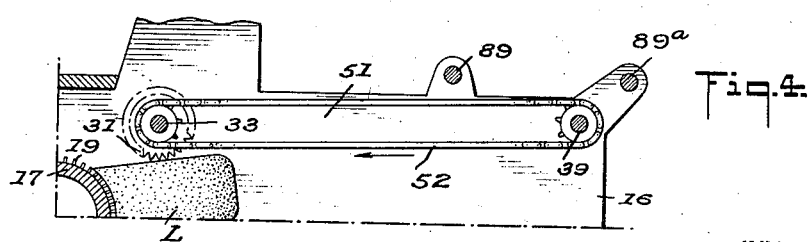

Figure 4 a detailed view showing one of the rollers for feeding the loaves to the primary grinder.

Figure 5:
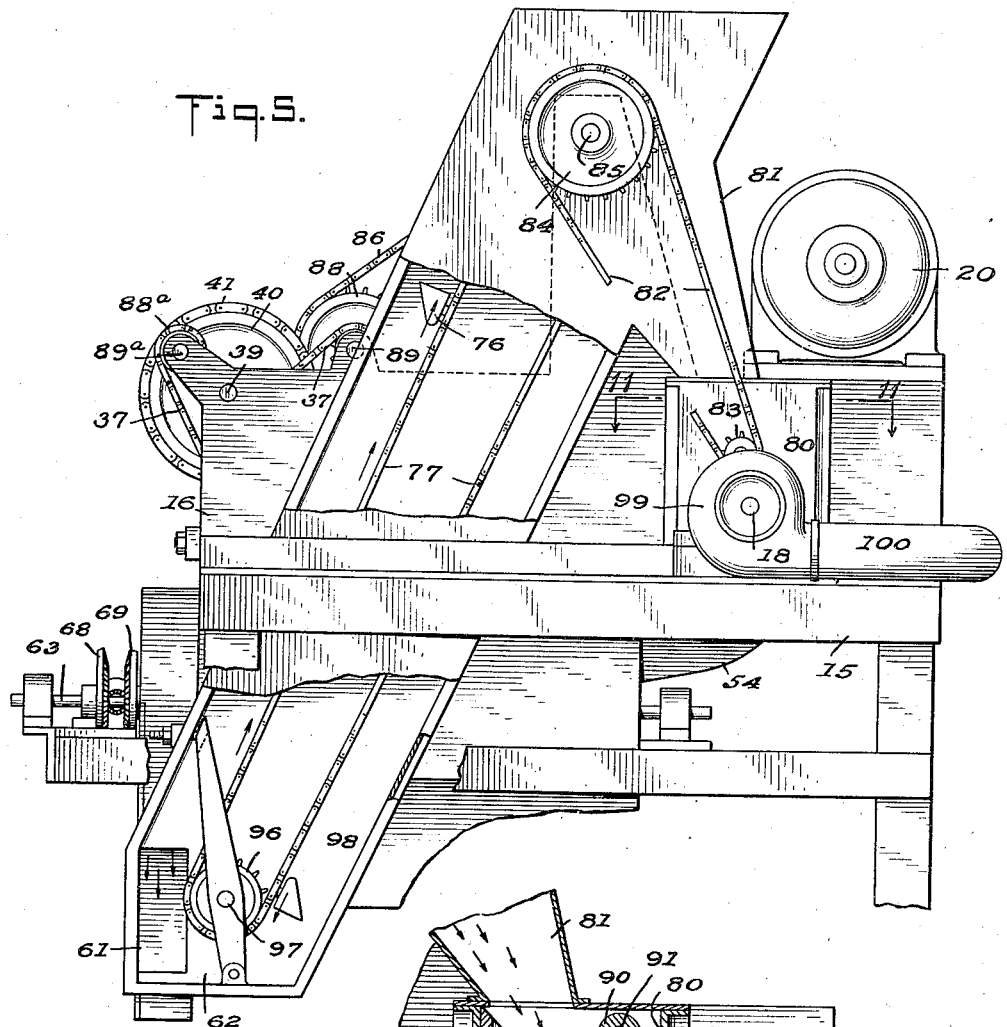

Figure 5 an elevational view taken from the side opposite to Figure 1 and partly broken away to show the conveyer elevator associated with the secondary grinder.

Figure 6:
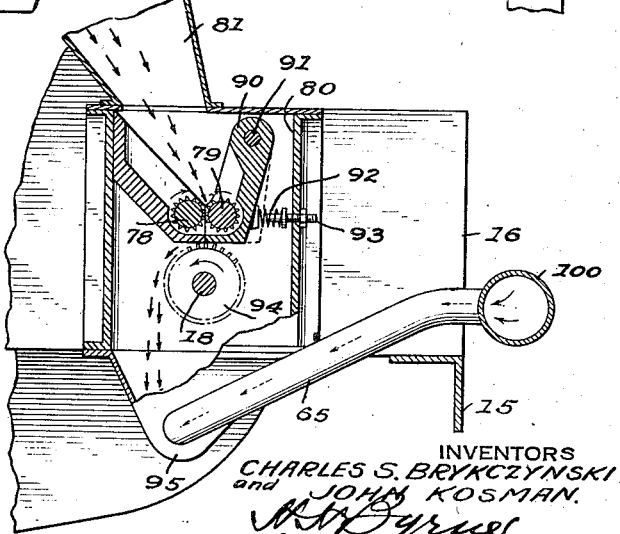

Figure 6 a central sectional view of the secondary grinder and associated portion of the pneumatic conveyer.

Figure 7 a top plan view of the machine with portions removed to show the primary grinder, conveyer belt, and the upper feeding roller.

Figure 8:
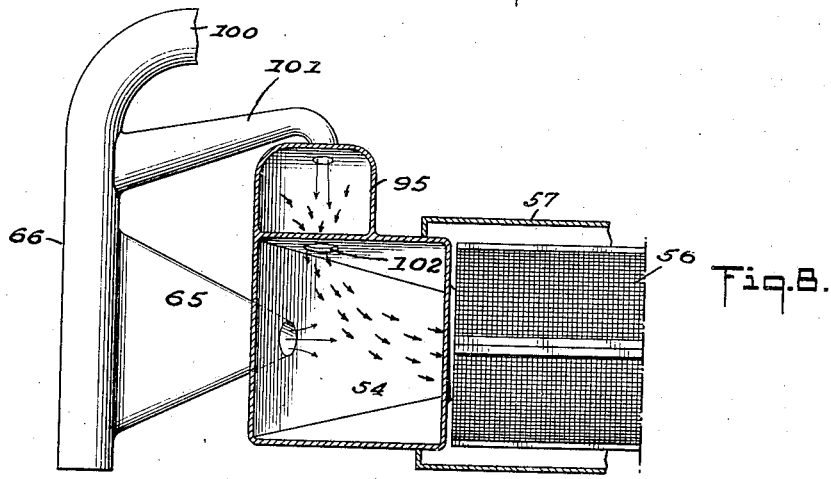

Figure 8 a horizontal sectional view on the line 8—8 of Figure 9.

Figure 9 a central longitudinal sectional view on the line 9—9 of Figure 7.

Figure 10 a vertical sectional view on the line 10—10 of Figure 9.

Figure 11 a horizontal sectional view on line 11—11 of Figure 5.

Figure 12 a detailed view of the screen brush elements.

Figure 13 a side elevational view of the primary grinder.

Figure 14 a fragmentary elevational and sectional view thereof, and;

Figure 15 a transverse sectional view of the same.

Figure 16 shows a modified construction.

The apparatus comprises essentially seven cooperable and inter-dependent units, to wit: (1) A primary grinder. (2) A conveyer and feeding means therefor. (3) A screen separator. (4) A secondary grinder. (5) A conveyer therefor. (6) A pneumatic distributor, and; (7) A motor and transmission mechanism, all assembled into a compact and unitary structure upon suitable framework 15 within the housing 16 as shown.

The primary grinder consists of a cylinder 17 on shaft 18, having a plurality of closely assembled teeth 19 adapted to act against the loaf of bread L, or other article to be ground, and the construction of said grinder and the high speed at which it rotates thoroughly reduces the material into finely comminuted particles or grains that are delivered into the separator unit after the manner indicated by arrows in Figure 9. High speed is imparted to the grinder 17 from the motor 20 through chain and sprocket 21—22 connecting the sprocket 23 on grinder shaft 18 as shown in Figures 1 and 7.

The conveyer and feeding means for the bread loaves or other bodies L consists of an endless belt 25 riding on pulleys 26 and 27 of shafts 28 and 29 suitably journalled within the housing 16 (Figures 2, 9 and 10), and said belt 25 is disposed horizontally with its receiving end located at the front of the machine within convenient reach of the operator and is geared to travel at a speed commensurate with the rate of rotation of the grinder whereby each loaf may be delivered and completely reduced before taking on the next. That is to say the grinder and conveyer belt are so timed to function that the loaves will be consumed singly and in the order of feeding to the machine thus avoiding the likelihood of congestion, crowding or overloading, which would likely occur if more than a single loaf was being acted upon by the teeth of the grinder at one and the same time.

In the feeding operation the bread loaves are forcibly delivered and firmly fed against the teeth of the grinder since such loaves, e. g. rye bread or pumpernickel as herein especially designed to be treated are usually of exceptionable hardness, and unless so forcibly fed would tend to resist the intimate contact with teeth 19 of the grinder with that degree essential for complete disintegration. This positive feeding or forcibly holding each loaf L against the teeth of the grinder is accomplished by a pair of toothed cylinders or rollers 30 and 31 mounted respectively on fixed and floating axles 32 and 33 (Figures 7 and 9) and said rollers are so located with respect to the discharge end of the conveyer belt 25 that each loaf, as it leaves said belt, is positively gripped there-between and fed forcibly against the abrading or cutting surface of the grinder and which due to its high speed cuts away and reduces the same into fine grains or crumbs that are subsequently delivered to the separator along the path of arrows as indicated.

The conveyer belt 25 is connected to be driven through sprocket 34 (Figure 2) on shaft 28 by the chain loop 35 which in turn rides on sprocket 36 of shaft 29 driven by chain loop 37, said chain 37 being driven by sprocket 38 on shaft 39 having a large sprocket 40 (Figure 1) carrying chain 41 from sprocket 42 of shaft 43 of a reducing gear contained in casing 44 (Figure 7). Shaft 45 of said reducing gear is driven through bevel-gearing 46—47 by shaft 48 having chain and sprocket connection 49—50 with high speed shaft 18 driven directly from motor 20.

The upper feeding roller 31 is freely or floatingly mounted by means of two arms 51 (Figures 4 and 7) carrying its shaft 33 and said arms have limited pivotal or lifting movement on shaft 39 extending cross-wise of the machine (Figures 3 and 7). The lower or fixed feeding roller 30 has a sprocket 53 on its shaft 32 connecting with the chain loop 35 (Figure 2), and the upper or floating roller 31 is driven by chain 52 from shaft 39 (Figure 4).

The screen separator is located immediately beneath the conveyer belt 25 (Figure 9) and receives the ground particles or bread crumbs from the chute 54 that flow substantially along the lines indicated by the arrows and discharge at point 55 into the lower portion of the rotatable screen 56 where it is subjected to further agitation and spreading by the screen brushes 59—60 and thereby the finer particles are sifted into the receptacle or trough 57 having a removable bottom 58. Such material or oversized granules as is not thus separated is caused to flow or be moved along in the direction of the arrows for further grinding through the medium of said brushes (59—60) which rotate counter-wise to the direction of motion of screen 56. Thus all ground material from the primary grinder 17 is thoroughly spread out or distributed into a relatively fine or thin layer and simultaneously agitated or worked upon by the screens and brushes thereby insuring separation from the flowing mass of all crumbs or other particles having the size or mesh of said screen 56, and such as is not thus removed is carried forward for delivery into a chute 61 leading to a receiver 62 whence it is conveyed to the action of a secondary grinder.

The two brush elements 59—60 are disposed in such angular relation to its supporting shaft 63 that all material delivered to the bottom of the screen is caused to be constantly moved along and discharged through openings 64 at the screen end into the chute 61, and this flowing mass is accelerated by an air blast issuing through tube 65 of pipe 66 communicating with a source of air pressure.

The screen 56 and brushes 59—60 are oppositely rotated and at uniform speed (Figures 7 and 9) through bevel-gears 67—68 connected respectively to said screen and brushes, and meshing with a driving bevel-gear 69 on shaft 70 having gearing connection 71—72 with a chain and sprocket 73—74 and 75 from shaft 48 of the reducing gear transmission.

The secondary grinder receives all material delivered to receptacle 62 from chute 61 and to which it is conveyed by a bucket and chain elevator-conveyer 76—77 to be later described. Said secondary grinder (Figures 6 and 11) consists of a toothed cylinder 94 carried by high speed shaft 18 that receives the material from two co-acting and toothed feeding rollers 78 and 79 working within a casing 80 of housing 16 (Figure 5), the flowing mass being delivered into the hopper at bottom of chute 81 into which the buckets 76 discharge as indicated by the arrows in Figure 6. Said feeding rollers 78—79 are operated by a chain and sprocket drive 82—83 (Figure 3) from a large sprocket 84 on shaft 85 which in turn connects by chain and sprocket 86—87 with sprocket 88 on shaft 89. The shaft 89 is driven by chain loop 37 (Figure 2) which also drives shaft 39 of the upper feeding roller 31. An idle sprocket 88a carries the idle loop of chain 37.

The material delivered to said feeding rollers 78—79 will frequently flow in uneven or non-uniform volume—as with the primary grinder—and to provide or compensate therefor the roller 79 (Figure 6) is carried by an arm 90 pivoted at 91 and adapted to have limited angular movement against the tension of spring 92 on bolt 93, and it will thus be seen that, with roller 78 fixedly mounted and both rollers going at appreciably high speed, the material will be forcibly delivered to and acted upon by the toothed cylinder or grinder 94 mounted on high speed shaft 18. After such final treatment the resultant product accumulates in the receptacle or pocket 95 (Figure 6) from where it is again carried by the air blast to the screen separator unit.

The secondary conveyer or means for delivering to the secondary grinder consists of a plurality of buckets 76 (Figure 5) on an endless chain 77 which travels on sprockets 96 of shafts 97 and 85 respectively, and said buckets act to scoop the granular material which accumulates within the receiver portion 62 of the conveyer housing 98. Conveyer shaft 85 is driven by chain and sprocket connections 86—87 from sprocket 88 on shaft 89.

The pneumatic distributor and conveyer consists of a suitable blower 99 on shaft 18 of the primary grinder and thus operating at high speed an air blast of appreciable volume is created through pipes 100—66 and funnel 65 into trough 54 immediately beneath the primary grinder 17 (Figures 8 and 9), thence along the path of arrows directly into the receiving end of the screen separator 56, and ultimately through the mesh of the screen into the hopper 57. The carrying air blast for the material acted upon by the secondary grinder is provided by the tubular by-pass 101 directly connecting blower pipe 100 with receptacle or pocket 95 which communicates through opening 102 with hopper 54 (Figure 8).

The primary grinder (Figures 13, 14 and 15)

comprises a plurality of segmental sections overlying and suitably secured to a drum 103 by screw bolts 104 counter-sunk within the exterior surface of said segments thereby providing an uninterrupted and smooth exterior cylindrical surface. The grinder elements per se consist of a series of pins 105, (corresponding with pins 19), projecting uniformally beyond the cylindrical surface and arranged in staggered relation so that the entire mass of pin points presents an even grinding surface to uniformally cut-away the loaf L or other substance, and in such manner that the resultant mass is appreciably uniform and suitable for conveniently passing through the mesh of the screen separator. The pins 105 are securely fastened and held against all likelihood of displacement by having their head portions in counter-sinks within the inner surface of the cylindrical segments as indicated in Figures 14 and 15. In the construction shown in Figure 16 the drum 106 is formed of two or more sections and the grinders or pins 107 are secured in the manner shown. Said pins, in section, may be round, ovoid, square or any variation between a triangle, square or circle.

*Gearing transmissions*

The transmission for the conveyer belt 25 is through the following elements: Motor 20, chain 21, sprocket 23, shaft 18, chain 50, shaft 48, sprocket 49, miter-gearing 46—47, shaft 45, reduction gear box 44, shaft 43, sprocket 42, chain 41, shaft 39, sprocket 38, chain loop 37, sprocket 36 and chain 35 to driving shaft 28 carrying belt pulley 26.

The lower feeding roller 30 is driven through chain loop 35 engaging sprocket 53 on shaft 32 carrying said lower roller 30 and the upper feeding roller 31 is driven by chain 52 from shaft 39, sprocket 40, chain 41, sprocket 42 to shaft 43 of reduction gear 44.

The drive for the primary grinding roller 17 is directly through motor 20, chain and sprocket drive 21—22 to large sprocket 23 on shaft 18 carrying said primary grinder.

The screen separator 56 and brush agitator 59—60 therefor are driven from shaft 18, chain 50, sprocket 49, shaft 48, chain and sprocket elements 73, 74 and 75, meshing pinions 72—71, shaft 70, and miter-gears 67, 68 and 69 to brush shaft 63 and screen 56.

The feeding rollers 78—79 of the second grinder 94 are driven through shaft 18, chain 50, sprocket 49, shaft 48, bevel-gears 46—47, shaft 45, reduction gear 44, shaft 43, chain 42, sprocket 40, shaft 39, sprocket 38, chain 37, shaft 89, sprocket 88, chain 86, sprocket 87, shaft 85, sprocket 84, chain 82, and sprocket 83 to shaft of roller 78. The grinding roller 94 is mounted directly on high speed shaft 18.

The bucket conveyer 76—77 is operated through shaft 85, sprocket 87, chain 86, sprocket 88, shaft 89, chain loop 37, sprocket 38, shaft 39, sprocket 40, chain 41, sprocket 42, shaft 43, to reduction gear 44.

The fan or blower 99 is connected to be driven from the motor 20, sprocket 22, chain 21, sprocket 23, connected to shaft 18 on which the blower is mounted.

*Résumé*

The bread loaf L or other body to be ground is placed on conveyer belt 25 and carried to the gripping or positive feeding action of the toothed cylinders 30 and 31 whence it is forcibly delivered to the disintegrating action of the teeth or pins 19 of grinder 17, the reduced particles falling into hopper 54 and thence conveyed by air blast to the screen separator (56—59) where the finer portion is separated and passes into hopper 57. Such material as has not been screened thence by the same air blast follows the course of arrows through screen discharge openings 64 and passes into trough 61, thence to receptacle 62 from where it is carried by the chain and bucket conveyer 77—76 into hopper 81, and delivered to the action of the secondary grinding roller 94. The reduced product entering receptacle or pocket 95 is carried by the flowing air from tubes 100 and 101 to the trough 54 whence it is again passed to the separating cylinder for further and final treatment as set forth.

It will be understood the invention as herein disclosed is not limited to the details of construction shown and described, and that these may be varied widely without departing from the spirit of the invention except as defined by the claims.

What is claimed as new is:

1. The method of reducing relatively hard and appreciably large solid bodies to fine granular form which consists in firstly gripping the solid body and positively, slowly and lateralwise feeding said solid body and simultaneously therewith subjecting the advancing surface thereof to the grinding action of a primary grinder operating at high speed, carrying the ground material through the medium of gravity and by air current to a screen and initially screening the same under mechanical agitation and by action of the air current to separate the larger particles therefrom, collecting and conveying such larger particles to and subjecting the same to the grinding action of a secondary grinder operating at high speed, mixing the doubly ground material with initially ground material ground by the primary grinder from the solid body, and screening the mixed materials.

2. The method of reducing relatively hard and appreciably large solid bodies to fine granular form which consists in first gripping the solid body and positively, slowly and lateralwise feeding said solid body and simultaneously therewith subjecting the advancing surface thereof to the grinding action of a primary grinder operating at high speed, conveying the ground material through the action of gravity and by air current to a screen arranged below the level of the primary grinder and initially screening the same under mechanical agitation and the action of the air current to separate the larger particles therefrom, collecting and conveying such larger particles to an elevated point above the level of the primary grinder and then subjecting such larger particles to the grinding action of a secondary grinder operating at high speed, then conveying the doubly ground material downwardly and mixing the same with initially ground material from the solid body being conveyed from the primary grinder for initial screening, and finally conveying the mixed materials in the manner before described to the screen and similarly screening the same.

3. In a machine for grinding appreciably large and hard solid bodies, the combination of a feed conveyer for the solid body, a pair of slow moving and toothed feeding rollers located adjacent the discharge end of the conveyer, a high speed grinder adjacent the toothed feeding rollers, said toothed rollers being operable to firmly engage and hold the body fed up by the conveyer during the high speed grinding operation, a screen separator beneath the conveyer, a blower for supplying a current of air to feed the material from the grinder to the screen separator, said screen separator adapted to distribute and assort the ground material, a receptacle arranged to receive from the screen separator the larger particles of material, a secondary high speed grinder, a conveyer for conveying the larger particles of material from said receptacle to the secondary high speed grinder to be reground thereby, and a conductor for conducting the reground material to and mixing the same with the initially ground material from the primary grinder for feed therewith to the screen separator.

4. In a machine for grinding appreciably large and hard solid bodies, the combination of a feed conveyer for the solid body, a pair of slow moving and driven toothed feeding rollers located adjacent the discharge end of the conveyer, a primary high speed grinder arranged adjacent to and cooperable with the toothed feeding rollers, said toothed rollers being operable to feed the body to the primary grinder and to firmly hold the body during the high speed grinding operation, a separator below the conveyer adapted to receive by gravity the ground material from the primary grinder, mechanical means for feeding the coarser material longitudinally through the separator, a downwardly inclined chute for conveying the coarser material away from the separator, a conveyer adjacent the lower end of the inclined chute for elevating the coarser material, a blower for supplying a current of air to the separator, secondary rollers for receiving and shaping into a mass the coarser material elevated by the conveyer and to prepare the same for a regrinding action, and a secondary high speed grinder cooperable with said secondary rollers to grind said coarser material, substantially as set forth.

5. In an apparatus for regrinding ground solid bodies, the combination of a hopper having a movable bottom section, a pair of toothed feeding and pressure rollers arranged side by side in close proximity to each other and located wholly withing said hopper in proximity to the bottom thereof and cooperable to shape gravity fed material into a substantially uniform mass and advance the same, the movable bottom section of said hopper being adapted to automatically open under pressure of the material and release the material accumulated therein, and a high speed grinder located below the hopper bottom and adapted to reduce the material mass as it issues from the hopper to a finely ground condition.

6. In an apparatus for regrinding ground solid bodies, the combination of a hopper to receive and confine the ground material, said hopper having a movable bottom section, a pair of driven and toothed feeding and pressure rollers arranged side by side in close working relationship to each other and located wholly in said hopper adjacent to the bottom thereof and operating to shape said material into a substantially uniform mass and positively force the same downwardly, one of said pressure rollers being mounted on the movable section of the hopper and being movable therewith whereby material accumulated in the hopper may be automatically released at the bottom of the hopper, and a high speed grinder located below the hopper adapted to reduce the mass of material as it issues from the hopper to a finely ground condition.

7. In an apparatus for regrinding loose ground material, a hopper to receive and confine the loose ground material, said hopper having a bottom outlet, a pair of toothed feeding and pressure rollers disposed horizontally side by side in said hopper in close relation to each other and above and in close proximity to said outlet for the direct feed of material thereby downward through the outlet, one of the rolls being mounted for relative movement from and toward the other, pressure means for holding the rolls yieldingly pressed toward each other and in substantially abutting contact with each other to cause said rolls to normally close communication between the hopper and the outlet, said pressure means being adapted to yield under pressure of a predetermined amount of material in the hopper to permit the rolls to spread apart for a feeding action, whereby the rolls are adapted in their feeding action to compress the particles of the loose ground material together into a mass and force the compressed mass downwardly through said outlet, and a high speed toothed grinding roller disposed beneath the bottom of the hopper in proximity to the outlet, said roller having grinding coaction with said hopper bottom only, and being out of grinding contact with all other surfaces of the apparatus, to break up and finely grind the compressed material issuing from the outlet directly as fed thereto by the rolls.

CHARLES S. BRYKCZYNSKI.
JOHN KOSMAN.